Nov. 4, 1930.  J. N. PARKER  1,780,599
MOTOR VEHICLE
Filed March 5, 1926   3 Sheets-Sheet 1
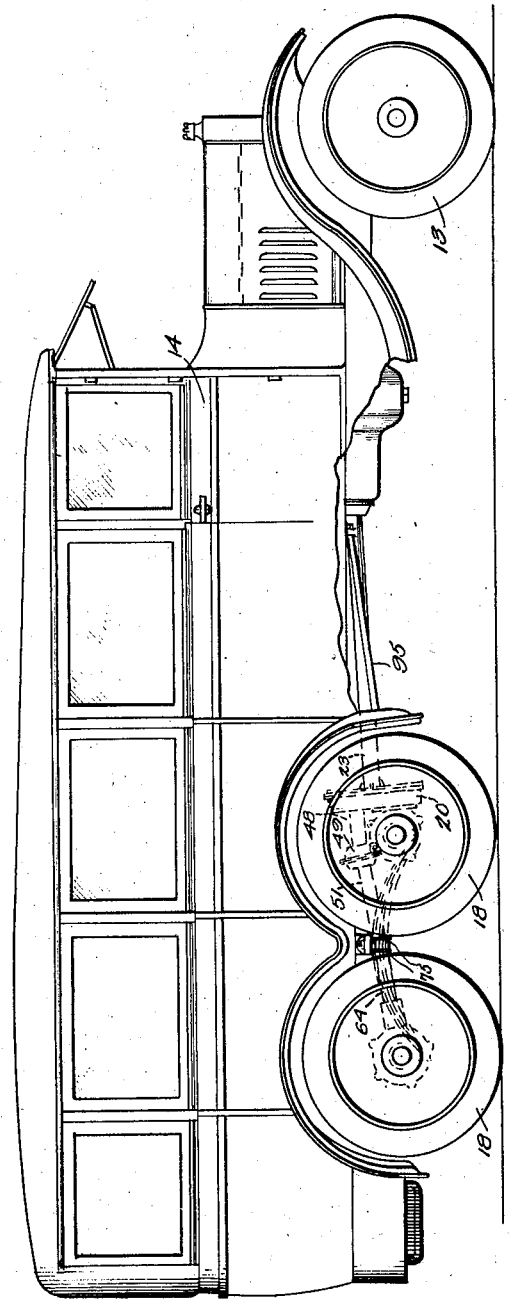
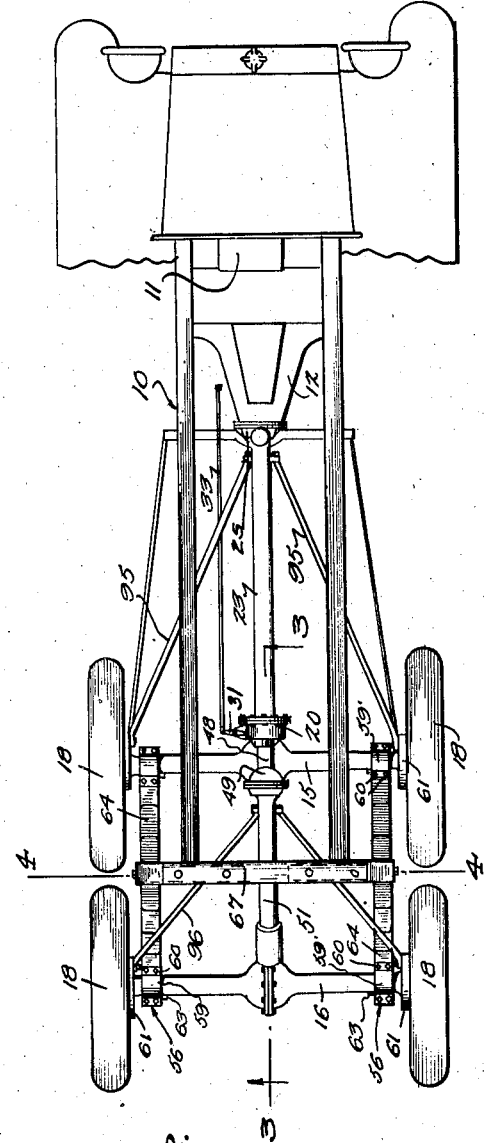
Inventor
J. N. PARKER Nov. 4, 1930.  J. N. PARKER  1,780,599
MOTOR VEHICLE
Filed March 5, 1926   3 Sheets-Sheet 2

Inventor
J. N. PARKER

By
Ch. Parker
Attorney

Nov. 4, 1930.  J. N. PARKER  1,780,599
MOTOR VEHICLE
Filed March 5, 1926  3 Sheets-Sheet 3
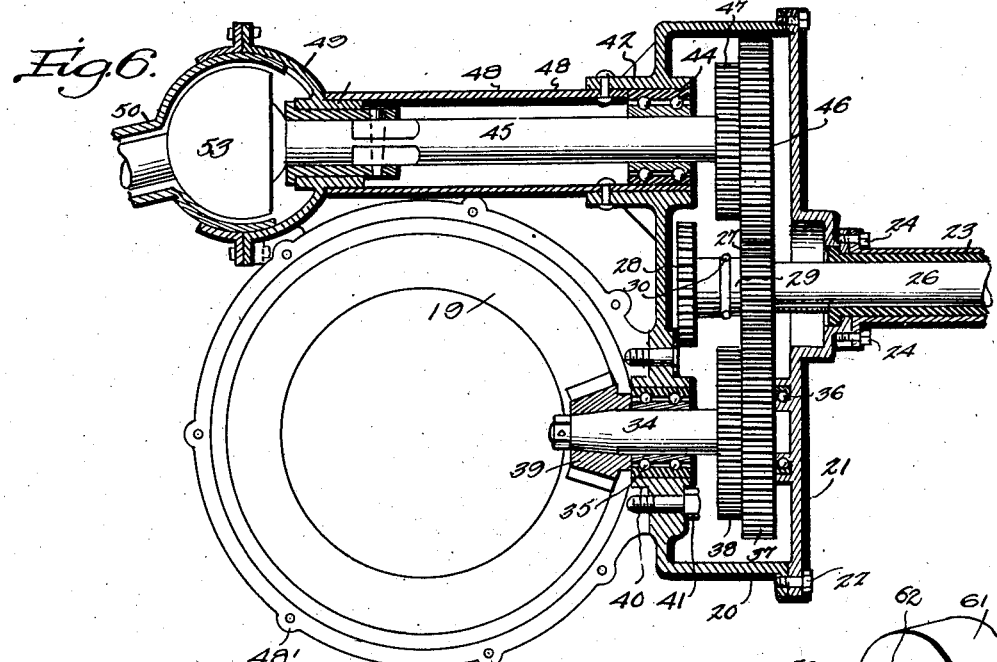
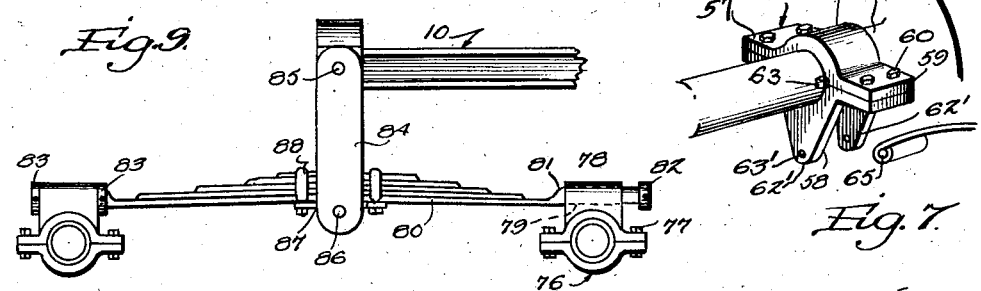
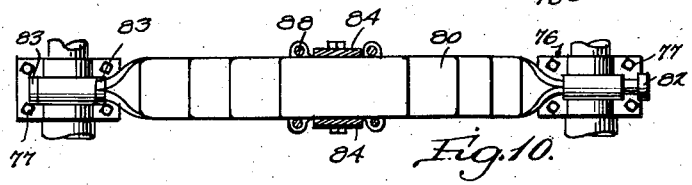
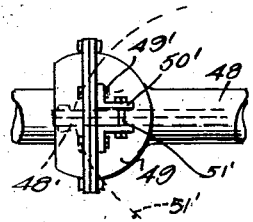
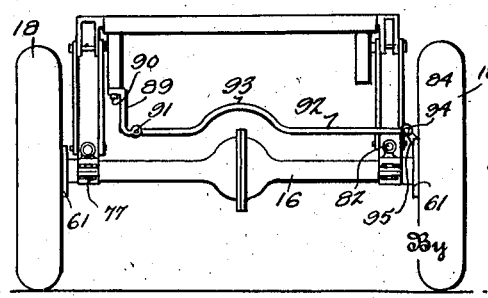
Inventor
J. N. PARKER
By Ch. Parker
Attorney Patented Nov. 4, 1930

1,780,599

UNITED STATES PATENT OFFICE

JOSEPH N. PARKER, OF BEDFORD, VIRGINIA

MOTOR VEHICLE

Application filed March 5, 1926. Serial No. 92,466.

This invention relates to motor vehicles and more particularly to the provision of novel driving and spring suspension means for motor vehicles employing a plurality of driving wheels at each side of the vehicle adjacent the rear end thereof.

An important object of the invention is to provide a motor vehicle having a plurality of driving wheels at each side of the vehicle adjacent its rear end, and to provide novel torque driving means connected between the rear axles and the frame of the vehicle.

A still further object is to provide a pair of rear driving axles arranged adjacent the rear end of the vehicle and provided with driving wheels at their opposite ends, the axles and frame of the vehicle being connected by novel torque drive means for transmitting the driving power of the rear wheels to the frame of the vehicle.

A still further object is to provide a vehicle of the character mentioned provided with a pair of parallel axle housings each provided internally with axle sections and a differential, the driving shafts for said axles being arranged in torque tubes whereby both axles are adapted to maintain substantially the same position with relation to each other at all times and to deliver the driving power of the rear wheels to the frame through the torque tubes.

A still further object is to provide a structure of the character mentioned which is particularly adapted for use in connection with Ford automobiles employing a planetary transmission arranged adjacent the rear end of the motor, an additional change speed device being associated with the propeller shaft forwardly of the forward driving axles and adapted to be used in conjunction with the usual transmission for affording additional changes in the driving ratios between the engine speed and the speed of the rear wheels.

A still further object is to provide novel spring supporting means for the body of the vehicle, associated with the rear axles to provide an efficient supporting means for the body of the vehicle to cushion shocks transmitted to the body by vertical movement of the wheels.

A still further object is to provide a vehicle of the character mentioned employing a pair of parallel axle housings adjacent the rear of the vehicle each having axle sections and a differential associated therewith and adapted to be driven by novel means from the motor, a spring being arranged adjacent each side of the vehicle and connected at its ends to the axle housings, the center of each spring being connected to the frame of the vehicle.

A still further object is to provide a vehicle of the character just mentioned wherein the center of each spring is pivotally connected to the frame of the vehicle whereby it is adapted to swing upon upward movement of either pair of driving wheels to distribute the strain throughout each spring thus effecting a greater cushioning action and permitting the use of lighter axle housing springs, etc.

A still further object is to provide a vehicle of the character mentioned wherein the rear axle housing and its associated wheels are adapted to swing slightly to permit the rear wheels to track with respect to the forward driving wheels when the vehicle is turning.

A still further object is to provide means connected between the rear driving axle housing and the frame of the vehicle to prevent undue lateral movement of the wheels associated with the rear axle housing when the vehicle is backing.

Other objects and advantages of the invention will become apparent during the course of the following description.

In the drawings I have shown several embodiments of the invention. In this showing:

Figure 1 is a side elevation of a vehicle embodying the invention, parts being broken away;

Figure 2 is a plan view, parts being broken away,

Figure 3:
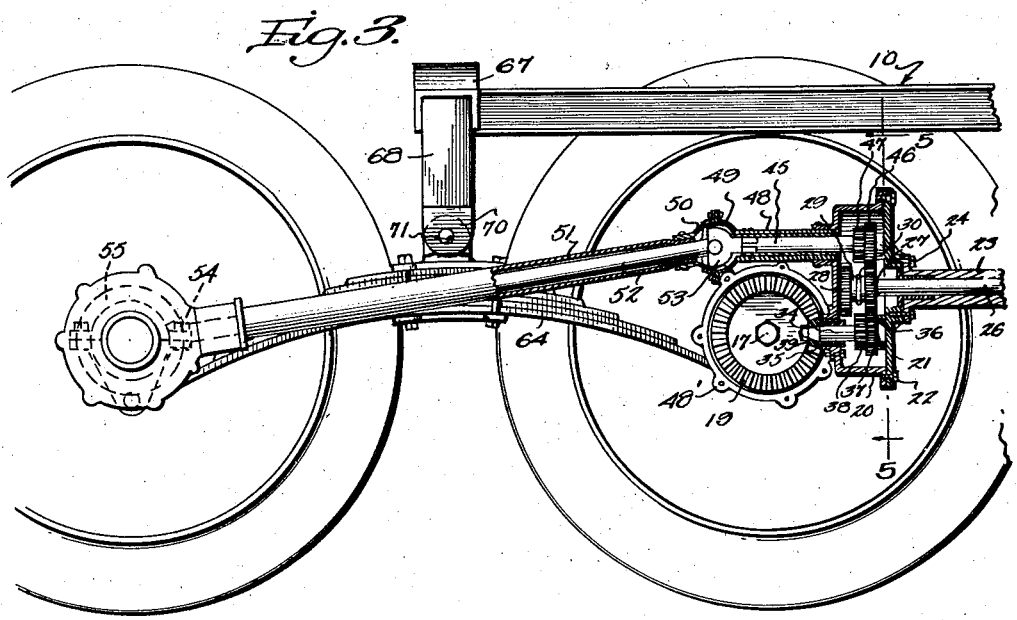
Figure 3 is a section on line 3—3 of Figure 2, parts being shown in elevation.

Figure 6 is an enlarged fragmentary sectional view through the rear transmission gearing and associated elements, Figure 7 is a fragmentary perspective of one of the spring mountings, Figure 8 is a fragmentary bottom plan of the rear universal joint, Figure 9 is an enlarged detail side elevation of a modified form of spring mounting, Figure 10 is a plan view of the same, parts being shown in section, Figure 11 is a rear elevation of a portion of the vehicle.

Referring to the drawings the numeral 10 designates the frame of the vehicle which supports the usual power plant 11 having a transmission housing 12 arranged at its rear end and containing a change speed transmission (not shown). The usual type of front wheels 13 are supported beneath the front end of the frame and are adapted to be steered in the usual manner. In the present instance I have illustrated a "bus" body 14 arranged on the frame of the vehicle, but it will be obvious that the invention may be applied to any form of motor vehicle employing truck or other forms of bodies.

A pair of spaced parallel axle housings 15 and 16 is arranged beneath the rear portion of the frame, as clearly shown in Figures 2 and 3. Each of the axle housings contains the usual axle sections 17 to which are secured driving wheels 18, and the axle sections of each housing are adapted to be driven through a differential including a ring gear 19.

A supplemental transmission housing 20 is arranged forwardly of the axle housing 15, as shown in Figures 2 and 3. This housing is provided with a cover plate 21 bolted thereto as at 22. The rear end of a torque tube 23 is bolted to the cover plate 21, as shown at 24. The rear end of the transmission housing 12 is provided with the usual socket 25 receiving the enlarged forward end of the torque tube 23 to form a driving connection therewith. The power plant, transmission and associated elements are the same as those employed in the Ford automobile and need not be described in detail. As is usual in this form of motor vehicle, a propeller shaft 26 is rotatable in the torque tube 23 and is provided within the socket 25 with a universal joint arranged concentric therewith and adapted to derive power from the engine 11 through the transmission 12.

Within the housing 20, the shaft 26 is provided with gears 27 and 28, as shown in Figure 3. These gears are splined to the shaft 26 and are connected by a collar 29 engaged by a fork 30 to slide the gears upon the shaft 26. The fork 30 is provided with an arm 31 pivotally connected to the housing 20 as at 32 and adapted to be operated by a rod 33 controlled from the driver's seat.

A shaft 34 is journalled adjacent its rear end in a bearing 35 formed in the housing 20, while the forward end of this shaft is journalled in a bearing 36 carried by the cover plate 21. A pair of gears 37 and 38 are secured to the shaft 34 and are adapted to mesh with the gears 27 and 28 respectively depending upon the position of the latter, as will be understood. The rear end of the shaft 34 extends into the differential housing and is provided with a pinion 39 meshing with the ring gear 19 to drive the differential associated therewith, as will be apparent. As previously stated, the driving force is adapted to be transmitted to the frame of the vehicle through the torque tube 23 and accordingly it is essential that the housing 20 be secured to the axle housing 15. It is the usual practice to provide the axle housing forwardly of the differential, with a circular opening in which the rear end of the usual torque tube is received. In the present case I have provided the rear portion of the housing 20 with a tubular extension 40 arranged in the opening in the axle housing, referred to, and bolts 41 having their heads arranged within the housing 20 are adapted to secure the latter to the axle housing, as will be apparent.

The housing 20 is provided in the upper portion of its rear wall with a preferably integral tubular portion 42 in which is arranged a bearing 44. A drive shaft 45 is rotatable in the bearing 44 and is provided with a pair of gears 46 and 47 corresponding to the gears 37 and 38 and adapted to mesh respectively with the gears 27 and 28. A torque tube 48 is secured to the tubular extension 42 and surrounds the shaft 45, as clearly shown in Figure 6. The tube 48 is provided at its rear end with a socket member 49 in which is arranged a hollow ball 50 carried by the forward end of a rear torque tube 51. The socket 49 is secured to the adjacent differential housing in the manner shown in Figure 8. The socket 49 is formed in two parts connected by flanges through which bolts 49' pass and two of these bolts are secured to angle irons 50'. The transmission housing is provided with bolt receiving ears 48' and the bolt 51' passes through one pair of the ears 48'. A shaft 52 is rotatable in the tube 51, and the adjacent ends of the shafts 45 and 52 are projacent ends of a universal joint 53 arranged concentric with the socket 49 and hollow ball 50 whereby the shafts and torque tubes are adapted to swing about a common center as will be apparent.

The rear end of the torque tube 50 is secured to the rear axle housing 16, as shown, and the rear end of the shaft 52 is provided with a pinion 54 similar to the pinion 39, which meshes with a differential ring gear 55 similar to the gear 19. It will be apparent therefore, that rotation of the shaft 52 is adapted to drive the rear wheels 18 in the usual manner.

Means are provided for resiliently supporting the frame and body of the vehicle on the axle housing 15 and 16. As shown in detail in Figure 7, the numeral 56 designates a spring shackle as a whole comprising upper and lower members 57 and 58. The shackle 56 is adapted to surround one axle near its outer end, as shown, and each upper and lower member is provided with a flange 59. Bolts 60 secure the flanges together, but do not clamp the shackles about the axle housings and accordingly the shackles are adapted to swing about the axes of the axle housings as a center. In the usual Ford automobile construction, a brake drum 61 is arranged at the outer end of the driving axle housing and in the present construction I have employed two standard passenger car axles each of which is provided at its ends with one of the brake drums referred to. Each brake drum 61 is provided with an inwardly extending integral tubular portion 62 which surrounds the outer end of the adjacent axle housing. In mounting the shackles 56 they are placed in position in such a manner that their outer faces contact with the inner ends of the tubular extensions 62 to prevent outward movement of the shackles. Inward movement of the shackles may be prevented in any suitable manner and in the present instance I have shown small metal blocks 63 spot welded upon the axle housings adjacent the inner faces of the shackles. The lower portion of each shackle is provided with a pair of depending ears 62 provided with alined openings 63, for a purpose to be described.

Springs 64 are arranged adjacent opposite sides of the vehicle, as shown. The springs employed are preferably of the multiple leaf type, the lower leaf of each spring being longer than the adjacent leaves and provided in its ends with the usual eyes 65 adapted to be arranged between pairs of ears 62. Bolts 66 pass through the eyes 65 and the openings 63 in the ears 62 to connect the ends of the springs to the axle sections. As previously stated the shackles are pivoted about the axle housings and accordingly it will be apparent that the lengthening and shortening of the springs due to vertical movement of the wheels is permitted without affecting the spacing between the axle housings.

Figure 4:
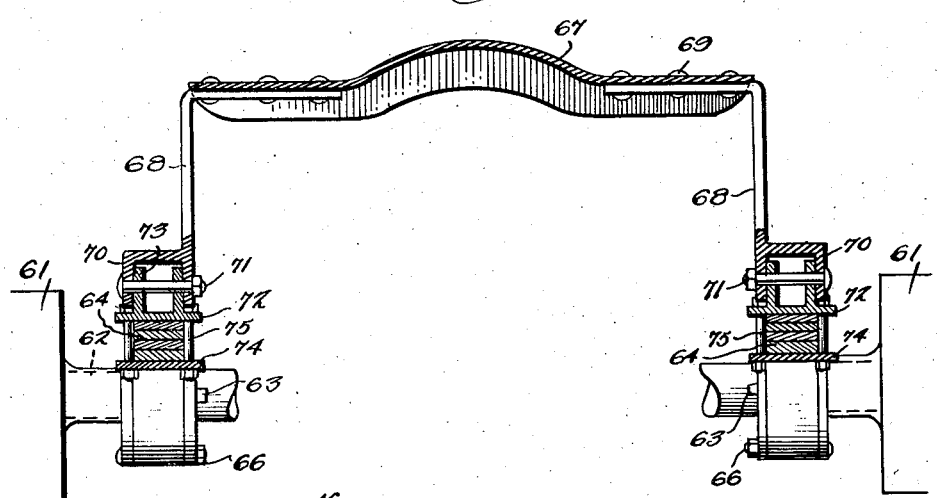
Figure 4 is a section on line 4—4 of Figure 2.
Figure 5:
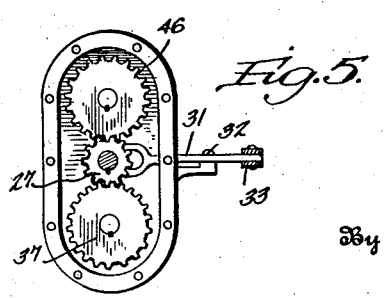
Figure 5 is a detail section on line 5—5 of Figure 3.

The frame 10 of the vehicle is provided adjacent its rear end with a cross brace 67, as shown in detail in Figure 4, and depending supports 68 are secured to this cross brace by rivets or the like 69. The lower ends of the supports 68 are provided with spaced ears 70, and bolts 71 extend through these ears. A plate 72 is arranged beneath each pair of ears 70, and each plate also is provided with a pair of upstanding ears 73 through which the adjacent bolt 71 extends whereby each plate will be pivotally supported to swing about its bolt 71, but the plates are fixed against movement longitudinally of the vehicle. The center of each spring is arranged against the bottom of one of the plates 72, and supplemental plates 74 are arranged beneath the springs. Clip bolts 75 secure the plates 72 and 74 together, thus anchoring the centers of the springs.

In Figures 9 and 10 of the drawings I have shown a modified form of spring supporting means. In this form of the invention, each axle housing is provided adjacent its ends with a spring support 76 which is mounted on the axle housing in a manner similar to that described in connection with the shackle 56. Each member 76 comprises complementary members adapted to be secured together by bolts 77, as shown. Each of the members 76 is provided with an upstanding portion 78 having a circular opening 79 extending therethrough. A spring 80 preferably of the leaf type, is arranged between the axle housings adjacent their ends, as will be understood. The spring 80 is preferably nearly flat as shown, and the lower leaf of each of the springs is curled at its ends as at 81 to provide a circular portion adapted to slide in the openings 79. One of the circular portions 81 is provided with a collar 82 secured thereto and arranged a slight distance from the adjacent shackle 76. The opposite end of each of the springs is provided with collars 83 secured thereto and arranged against the shackles to prevent longitudinal movement of the spring with respect to the adjacent shackles. A pair of depending links 84 are pivotally connected at their upper ends as at 85 to the frame of the vehicle, and are pivotally connected at their lower ends as at 86, to a spring supporting plate 87. It will be apparent that one of the pairs of links is arranged adjacent each side of the frame to be associated with the adjacent spring 80. Each spring 80 is secured by clips 88 to the adjacent plate 87, as will be apparent.

As will be described, the rear wheels 18 are adapted to track when the vehicle moves forwardly in a curve, but when the vehicle is backed when unloaded there is a tendency for the rear wheels 18 to move laterally when the front wheels 13 are turned. In Figure 11 of the drawings I have shown means for preventing this lateral movement of the rear wheels 18. As shown, a depending member 89 is bolted as at 90 to the frame of the vehicle and is provided at its lower end with a pivot bolt 91. A cross arm 92 is arranged above and parallel to the rear axle housing 16 and may be provided centrally with an upwardly bowed portion 93 to provide proper clearance between the arm 92 and the differential housing. One end of the arm 92 is pivotally connected to the bolt 91 while the opposite end is pivotally connected as at 94 to an arm 95 carried by one of the brake drums. It will be apparent that the members 89 and 92, while relatively stiff, possess a slight degree of elasticity to permit the wheels to track in the usual manner when the vehicle is moving forwardly, but they tend to prevent lateral movement of the wheels when the vehicle is being backed.

The brake drums 61 of the forward axle housing 15 may be connected to the torque tube 23 by brace rods 95 in the usual manner. If desired, similar brace rods 96 may be connected between the rear brake drums 61 and the torque tube 51 adjacent the forward end of the latter, as shown in Figure 2.

The operation of the vehicle is as follows:

The motor 11 and the usual transmission contained in the housing 12 are operated in accordance with the standard practice for transmitting power to the shaft 26. Ordinarily, the transmission gearing within the housing 20 will be arranged as shown in Figure 3, and it will be apparent that rotation of the shaft 26 will drive the shaft 34 and in turn, the axle sections within the axle housing 15. The differential operates in its usual way for driving the traction wheels 18, as will be apparent. The gears 37 and 46 are the same size and accordingly the shaft 45 will be rotated at the same speed as the shaft 34. Since the gears 37 and 46 are arranged on opposite sides of the gear 27, it will be apparent that an efficient balanced drive is provided. Rotation of the shaft 45 obviously will be transmitted to the shaft 52 through the universal joint 53 to drive the rear traction wheels 18 in the same manner that the forward wheels 18 are driven. Thus it will be apparent that the driving force of the motor is transmitted equally to both sides of traction wheels 18. As previously stated, the rear casing 20 is secured to the rear axle housing 15 and accordingly the longitudinal driving force exerted by the forward wheels 18 will be transmitted to the torque tube 23, which is secured to the housing 20. The forward end of the torque tube is universally connected with the rear end of the transmission housing in accordance with the standard practice, and thus it will be apparent that the driving force is transmitted to the frame and body of the vehicle. As previously stated the socket 49 is rigidly connected to the differential housing of the axle housing 15, thus assisting in preventing any tendency of the housing 20 to swing under the influence of torques from the driving force exerted by the traction wheels. The longitudinal driving force exerted by the rear set of traction wheels 18 obviously will be transmitted to the torque tube 51, and the connection between the latter and the socket 49 transmits this driving force to the torque tube 48 from whence it is transmitted forwardly through the housing 20 and tube 23 in the same manner as the driving force from the forward set of wheels 18. The torque tubes 48 and 51, and the universal connection between these members, serves to properly maintain the spaced relationship between the axle housings 15 and 16. No other means is necessary for maintaining the proper spaced relation between the axle housings.

In the form of the spring mounting illustrated in Figures 1 to 7 inclusive, it will be apparent that the length of the springs will vary slightly as the traction wheels move vertically. The pivotal connection of the shackles 56 with the axle housings permits the ends of the springs to move longitudinally with respect to the vehicle to accommodate the varying lengths of the springs. Assuming that the forward wheels 18 rise, it will be apparent that the forward ends of the springs 64 will flex in the usual manner. As previously stated, the springs are pivotally connected at their centers with the depending supports 68, and it will be apparent therefore that under the conditions mentioned, the rear portions of the springs will be tilted downwardly, thus distributing the strain through both ends of each spring, effectually increasing the cushioning action of the springs. Similarly it will be apparent that the reverse will be true when the rear traction wheels 18 are elevated, in this case the rear ends of the springs being flexed upwardly while the forward ends of the springs are flexed downwardly. Obviously the device depends upon the resiliency of the springs for properly spacing the end portions of the forward and rear traction wheels, and the wheels will maintain their alined positions as shown in Figure 2 when the vehicle is being driven forwardly in a straight line. If the front wheels are operated to turn the vehicle to the right, however, there will be a tendency of the left rear wheel 18 to track backwardly, and this action tends to swing the right wheel forwardly. This action is permitted within reasonable limits by the shackle connections of the springs, and accordingly the rear set of wheels is permitted to properly track with respect to the forward wheels 18. When this action occurs it will be apparent that the shaft 52 and its torque tube 51 will swing slightly, and this action is permitted by the universal connection between these elements and the shaft 45 and torque tube 48.

In the form of the spring mounting illustrated in Figures 9 and 10, the action will be substantially the same as that previously described. In the modified form of spring mounting, it will be apparent that the rear ends of the springs will be fixed against longitudinal movement due to the arrangement of the collars 83, but the spring is permitted to move forwardly bodily due to the pivotal connection of the frame and spring with the links 84 and due to the sliding connection of the rounded ends 81 of the springs within the openings 79. Thus it will be apparent that this form of spring mounting also will permit a proper tracking action of the rear wheels. It also will be apparent that variations in the length of the springs due to vertical movement of the wheels will be compensated for by the sliding action of the free ends of the springs.

It has been found that when the vehicle is unloaded and is backed in an arc of a circle, there is a slight tendency for the rear traction wheels 18 to swing laterally. This tendency is slight and need not be compensated for. However, in Figure 11 of the drawings I have shown a device which is adapted to assist in maintaining the rear traction wheels 18 in alinement with the forward wheels 18. As previously stated, the arms 89 and 92 possess a slight degree of resiliency to permit the tracking action referred to, but these elements are sufficiently stiff to resist movement of the rear wheels 18 from normal position and accordingly it will be apparent that the rear wheels 18 tend to remain in proper position when the vehicle is moving rearwardly.

When the vehicle is running light and unloaded, less power is required to operate the vehicle and accordingly I have provided the gear set within the housing 20. Under such conditions, the collar 29 may be moved forwardly by operating the rod 23 and lever 31 whereby the gear 28 will be brought into mesh with the gears 38 and 47. When driving under such conditions, the transmission in the housing 12 will be operated in the usual manner.

It is to be understood that the forms of the invention herewith shown and described are to be taken as preferred examples of the same and that various changes in the shape, size and arrangement of parts may be resorted to without departing from the spirit of the invention or the scope of the subjoined claims.

I claim:

1. A motor vehicle comprising a frame, a pair of normally parallel axle housings, a pair of axles in each of said housings, traction wheels secured to the ends of said axles, means for driving said axles, means for transmitting the driving force of said wheels to said frame including a member for positively spacing said axle housings at their centers, a spring arranged adjacent each side of said frame, and connections between the ends of said spring and said housings and between the centers of said springs and said frame, two of the connections of each spring including shackles, the other connection of each spring including pivot means fixed against movement longitudinally with respect to the vehicle, said springs being operative to normally maintain said housings in parallel relationship.

2. A motor vehicle comprising a frame, a pair of normally parallel axle housings, a pair of axles in each of said housings, traction wheels secured to the ends of said axles, means for driving said axles, means for transmitting the driving force of said wheels to said frame including a member for positively spacing said axle housings at their centers, a spring arranged adjacent each side of said frame, the centers of said springs being pivotally connected to said frame and fixed against movement longitudinally with respect thereto, and a shackle connecting each end of each spring to one of said axle housings, said springs being operative to normally maintain said housings in parallel relationship.

3. A motor vehicle constructed in accordance with claim 1 wherein one of said axle housings is arranged rearwardly of the other of said axle housings, and resilient means connected between said frame and said rearward axle housing to normally maintain the drive wheels thereof in alinement with the other of said wheels.

4. A motor vehicle constructed in accordance with claim 1 wherein one of said axle housings is arranged rearwardly of the other of said housings, a depending resilient arm secured at its upper end to said frame at one side thereof, and an arm connected at one end to the other end of said depending arm and at its opposite end to said rearward axle housing beneath the opposite side of said frame.

5. In a motor vehicle, a frame, a pair of parallel axle housings, a traction wheel arranged at the outer end of each housing, a pair of axles arranged in each housing, and connected to the wheels associated therewith, a differential arranged in each housing and connected between the axles of each pair, a gear casing secured to one of said housings, a gear in said casing connected to the adjacent differential, a motor mounted on said frame, a transmission shaft connecting said motor to said gear, a torque tube surrounding said shaft and secured at opposite ends to said gear casing and said motor, an auxiliary shaft connecting said gear to the other of said differentials, a torque tube surrounding said auxiliary shaft, said last named tube being secured at opposite ends to said casing and the housing of said last named differential, a spring arranged adjacent each side of the vehicle and connected at its ends to said housings, and at its center to said frame, each of said springs being arranged to permit resiliently opposed longitudinal movement of their ends with respect to said frame.

6. A motor vehicle constructed in accordance with claim 5 wherein two of the connections of each spring include a shackle, the other connection of each spring including a single pin fixed against longitudinal movement with respect to the vehicle.

7. In a motor vehicle, a frame, a pair of parallel axle housings, a traction wheel arranged at the outer end of each housing, a pair of axles arranged in each housing and connected at their outer ends to the wheels associated therewith, a differential arranged in each housing and connected between the axles of each pair, a motor mounted on said frame, a transmission shaft connected to said motor, a gear carried by said shaft, a pair of counter shafts arranged on diametrically opposite sides of said transmission shafts and each connected to one of said differentials, and a gear carried by each of said counter shafts and meshing with said first named gear.

8. A motor vehicle constructed in accordance with claim 7 provided with a casing enclosing said gears and secured to one of said axle housings, a torque tube surrounding said transmission shaft and secured at opposite ends to said casing and said motor, a tube fixed to said last named axle housing, a torque tube universally connected at one end to one end of said fixed tube and at its opposite end to the other axle housing, a counter shaft mounted in said fixed tube and secured at one end to one gear of said pair, a shaft mounted in said last named torque tube and connected at its rear end to the differential in said last mentioned axle housing, and universal means for connecting said counter shaft to said last named shaft.

9. In a motor vehicle, a frame, a plurality of pairs of traction wheels associated therewith, an axle connected to each of said wheels, a differential connecting the axles of each pair of wheels, an axle housing surrounding the axles and differentials of each pair of wheels, a motor carried by the frame, a drive shaft connected between said motor and one differential, torque means connected between the housing of the last named differential and said frame, drive means connected between said differentials, torque means connecting the central portions of said axle housings to each other and maintaining them in substantially fixed spaced relationship, and spring means connecting said housings to said frame and tending to maintain said axle housings in parallel relationship.

10. In a motor vehicle, a frame, a plurality of pairs of traction wheels associated therewith, an axle connected to each of said wheels, a differential connecting the axles of each pair of wheels, an axle housing surrounding the axles and differentials of each pair of wheels, a motor carried by the frame, a drive shaft connected between said motor and one differential, torque means connected between the housing of the last named differential and said frame, drive means connected between said differentials, torque means connecting the central portions of said axle housings to each other and maintaining them in substantially fixed spaced relationship, and a spring connected adjacent its center to each side of said frame, said springs being connected at their ends to the adjacent ends of said axle housings and being operative to normally hold the latter in parallel relationship.

11. A motor vehicle comprising a frame, front and rear normally parallel axle housings arranged adjacent the rear end of said frame, a pair of axles in each of said housings, traction wheels secured to the ends of said axles, means for substantially fixing the front axle against swinging action with respect to said frame, torque means connected and substantially fixing the distance between the central portions of said housings, means for driving said axles, means for transmitting the driving force of said wheels to said frame, and resilient means connecting the end portions of said axle housings to opposite sides of said frame and operative to normally retain the rear axle parallel to the front axle.

12. A motor vehicle comprising a frame, front and rear normally parallel axle housings arranged adjacent the rear end of said frame, a pair of axles in each of said housings, traction wheels secured to the ends of said axles, means for substantially fixing the front axle against swinging action with respect to said frame, torque means connected and substantially fixing the distance between the central portions of said housings, means for driving said axles, means for transmitting the driving force of said wheels to said frame, a spring arranged adjacent each side of said frame, and connections between the ends of said spring and said housings and between the centers of said springs and said frame, said springs being operative to normally maintain said housings in parallel relationship.

13. A motor vehicle comprising a frame, front and rear normally parallel axle housings arranged adjacent the rear end of said frame, a pair of axles in each of said housings, traction wheels secured to the ends of said axles, means for substantially fixing the front axle against swinging action with respect to said frame, torque means connected and substantially fixing the distance between the central portions of said housings, means for driving said axles, means for transmitting the driving force of said wheels to said frame, a spring arranged adjacent each side of said frame, the centers of said springs being pivotally connected to said frame and fixed against longitudinal movement with respect thereto and a shackle connecting each end of each spring to one of said axle housings, said springs being operative to normally maintain said housings in parallel relationship.

14. In a motor vehicle, a frame, a pair of parallel axle housings, a traction wheel arranged at the outer end of each housing, a pair of axles arranged in each housing and connected to the wheels associated therewith, a differential arranged in each housing and connected between the axles of each pair, a gear casing secured to one housing, a gear in said casing connected to the adjacent differential, a motor mounted on said frame, transmission means connected between said motor and said gear, torque means connected between said gear casing and said frame, auxiliary power transmitting means connected between said gear and the other of said differentials, a torque tube surrounding said auxiliary power transmitting means, said torque tube being secured at opposite ends to said gear casing and the housing of the last named differential, a spring arranged adjacent each side of the vehicle and connected at its ends to said housings and at its center to said frame, each of said springs being arranged to permit resiliently opposed movement of their ends longitudinally with respect to said frame.

15. In a motor vehicle, a frame, a pair of parallel axle housings, a traction wheel arranged at the outer end of each housing, a pair of axles arranged in each housing and connected to the wheels associated therewith, a differential arranged in each housing and connected between the axles of each pair, a gear casing secured to one housing, a gear in said casing connected to the adjacent differential, a motor mounted on said frame, transmission means connected between said motor and said gear, torque means connected between said gear casing and said frame, auxiliary power transmitting means connected between said gear and the other of said differentials, means for maintaining the central portions of said housings in substantially fixed spaced relationship, said torque tube being secured at its ends to said casing and the housing of said last named differential, and a spring pivotally connected adjacent its center to each side of said frame, the ends of said springs being connected to the ends of said housings and tending to resiliently hold the latter in parallel relationship.

16. In a motor vehicle, a frame, a pair of parallel axle housings, a traction wheel arranged at the outer end of each housing, a pair of axles arranged in each housing and connected to the wheels associated therewith, a differential arranged in each housing and connected between the axles of each pair, a gear casing secured to one housing, a gear in said casing connected to the adjacent differential, a motor mounted on said frame, transmission means connected between said motor and said gear, torque means connected between said gear casing and said frame, auxiliary power transmitting means connected between said gear and the other of said differentials, means for maintaining the central portions of said housings in substantially fixed spaced relationship, said torque tube being secured at its ends to said casing and the housing of said last named differential, and resilient means connecting the end portions of said axle housings to opposite sides of said frame and operative to resiliently hold said axle housings in parallel relationship.

17. In a motor vehicle, a plurality of pairs of normally parallel driving axles, a housing for each pair of axles, driving gearing in each housing, a torque tube rigidly connected at its rear end to each housing, a spherical support for the forward torque tube attached to the frame of the vehicle, a spherical support for the rear torque tube attached to the forward axle housing, driving shafts for the gearing in each of said torque tubes, universal joints for the driving shafts in each of said spherical supports, and spring means for supporting the frame of the vehicle above said housings and operative to normally hold said housings in parallel relationship.

In testimony whereof I affix my signature.
JOSEPH N. PARKER.